Jan. 6, 1959   E. O. N. ADAMS   2,867,359
SEED PACKAGE AND DISPENSER
Filed Jan. 18, 1957

INVENTOR.
E. O. N. ADAMS,
BY
McMorrow, Berman & Davidson
ATTORNEYS.

United States Patent Office 2,867,359
Patented Jan. 6, 1959

2,867,359

SEED PACKAGE AND DISPENSER

E. O. N. Adams, Redmond, Oreg., assignor of twenty-five percent to Merle L. Hogan, Redmond, Oreg.

Application January 18, 1957, Serial No. 634,921

3 Claims. (Cl. 222—485)

The present invention relates to a package and dispenser for seeds.

An object of the present invention is to provide a dispensing type package which lends itself to the storage of seeds and also to the even and efficient distribution of such seeds over an area to be planted.

Another object of the present invention is to provide a dispensing type package which lends itself to the distribution of mixtures of seeds of various sizes in such a manner that the seeds of one size are distributed as evenly as seeds of another size, one which lends itself to the distribution of lawn and turf seeds in various sizes, one which is sturdy in construction and of simple structure and one which may be economically manufactured.

These and other objects and advantages of the present invention will be fully apparent from the following description when taken in connection with the annexed drawing, in which.

Figure 1:
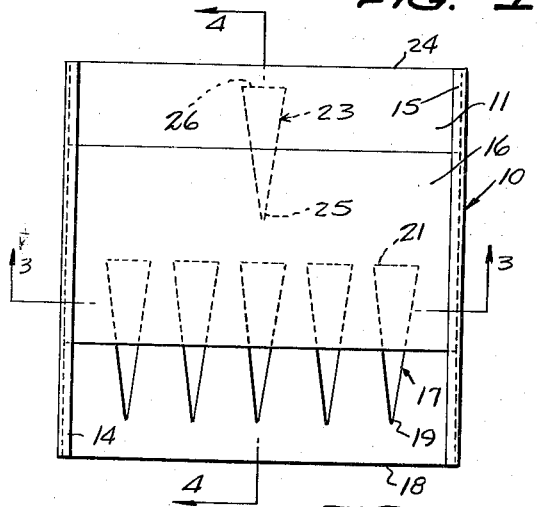
Figure 1 is a top plan view of the package according to the present invention.

The dispensing package for seeds according to the present invention comprises a receptacle 10 having an open top and a cover 11 extending over the open top of the receptacle 10. The receptacle 10 is of square cross sectional area and the two opposed side walls 12 and 13 (Figure 3) extend above the cover 11 and have their upper ends 14 and 15, respectively, bent over the cover 11 and spaced therefrom to form opposed trackways or grooves for a valve plate 16. The valve plate 16 is superimposed upon the cover 11 and is slidably movable thereon to positions partially or wholly bridging a row of openings 17 in the cover 11.

Each opening 17 increases in width from one end to the other to form an elongated triangularly shaped area and the row of openings 17 is arranged along and inwardly of the side edge 18 of the cover 11 with the narrow ends or apexes 19 adjacent each other and adjacent the cover side edge 18. The row of openings 17 are arranged so that the larger ends or bases 21 are adjacent each other and remote from the cover side edge 18 and extend in a line transversely of the cover 11 substantially in the center thereof.

A shelf 22 is positioned within the receptacle 10 below and spaced from the cover 11 and has an opening 23, shown in dotted lines in Figure 1, also of elongated triangularly shaped area substantially equal in size to each of the openings 17. The opening 23 in the shelf 22 is positioned inwardly of the side edge of the shelf adjacent the other side edge 24 of the cover 11. The opening 23 in the shelf 22 increases in width from the apex 25 to the base 26 and has its base 26 adjacent and spaced from the side edge of the shelf 22 adjacent the cover side edge 24.

The apex 25 of the shelf opening 23 is remote from the edge 24 of the shelf 22 and is spaced from the bases 21 of the openings 17 in the cover 11.

Figure 3:
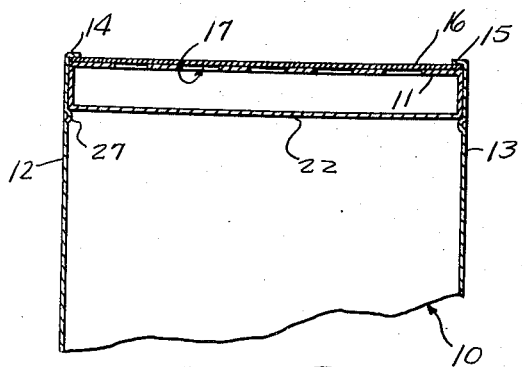
Figure 3 is a fragmentary sectional view taken on the line 3—3 of Figure 1.

The side walls of the receptacle 10 are provided with inwardly extending bosses 27 against which the shelf 22 abuts during the assembly of the receptacle 10, the shelf 22 in a preferred form being fabricated of a single sheet of material integrally with the cover 11 and bent to an elongated hollow open ended box structure as shown in Figure 3.

It has been found that for a dispensing package for turf and lawn seeds, the one opening 23 in the shelf 22 is preferably ⅜ of an inch long across the base 26 and preferably 1¼ inches from the base 26 to the apex 25 with the angle opposite the base 26 approximately 17 degrees 4 minutes. The openings 17 each have ⅜ of an inch long bases 21 and lengths of 1½ inches from the base 21 to the apex 19 and with the angle opposite the base 21 of approximately 14 degrees 15 minutes.

Figure 5:
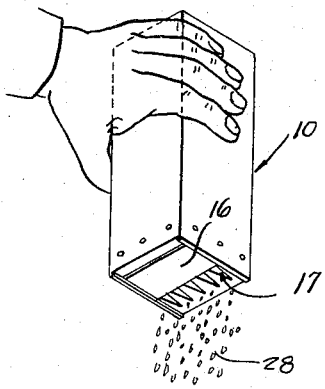
Figure 5 is a perspective view of the seed package in a position of use distributing seeds over an area to be planted.
Figure 2:
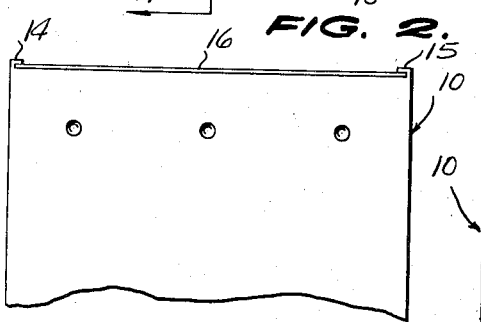
Figure 2 is a fragmentary elevational view of the assembly shown in Figure 1.
Figure 4:
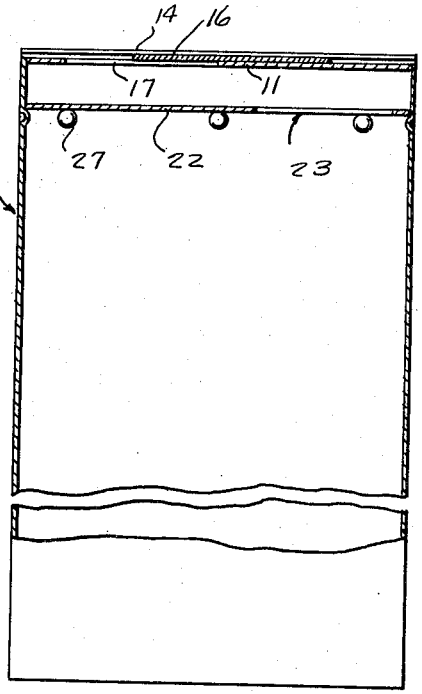
Figure 4 is a sectional view taken on the line 4—4 of Figure 1, with a portion of the package broken away.

In use, the receptacle 10 is inverted, as shown in Figure 5, and the valve plate 16 is moved to a position partially or wholly uncovering the openings 17. Upon gentle shaking of the receptacle 10 from one side to the other, the seeds 28 contained within the receptacle 10 will be shaken through the opening 23 and onto the cover 11 and then distributed through the openings 17 to a surface to be planted.

It is to be understood that the seed package according to the present invention need not be constructed in the dimensions as above described but may be constructed in such dimensions as to accommodate vegetable seeds, field or flower seeds, and all seeds which are normally broadcast by hand upon an area to be planted.

Although the invention has been specifically described in conjunction with seeds it is to be understood that it may also be employed for dispensing sized or granular material such as fertilizers.

What is claimed is:

1. A dispensing package for seeds comprising a receptacle having an open top, a cover extending over the open top of said receptacle, said cover being provided with a plurality of openings each of an elongated area, said openings being arranged in a row along and inwardly of one side edge of said cover, each of said openings being of the same area and increasing in width from one end to the other end thereof with the narrow and larger ends of the openings being adjacent each other, a shelf positioned within said receptacle below and spaced from said cover, said shelf having an opening positioned inwardly of the side edge of said shelf adjacent the other side edge of said cover, and a valve plate superimposed upon said cover and connected to said receptacle for sliding movement to positions partially or wholly bridging said cover openings.

2. A dispensing package for seeds comprising a receptacle having an open top, a cover extending over the open top of said receptacle, said cover being provided with a plurality of openings each of an elongated triangularly shaped area, said openings being arranged in a row along and inwardly of one side edge of said cover, each of said openings being of the same area with the apexes and bases of said openings being adjacent each other, a shelf positioned within said receptacle below and spaced from said cover, said shelf having an opening positioned inwardly of the side edge of said shelf adjacent the other side edge of said cover, and increasing in width from one end to the other end thereof with the larger end adjacent said shelf side edge and with the narrow end remote from said shelf side edge, and a valve plate superimposed upon said cover and connected to said receptacle for sliding movement to positions partially or wholly bridging said cover openings.

3. A dispensing package for seeds comprising a receptacle having an open top, a cover extending over the open top of said receptacle, said cover being provided with a plurality of openings each of an elongated triangularly shaped area, said openings being arranged in a row along and inwardly of one side edge of said cover, each of said openings being of the same area and with the apexes adjacent to said one side edge of said cover and the bases remote from said one side edge of said cover below and spaced from said cover, said shelf having an opening of elongated triangularly shaped area, said opening being positioned inwardly of the side edges of said shelf adjacent the other side edge of said cover with its base adjacent said shelf side edge and its apex remote from said shelf side edge and spaced from the bases of said cover openings, and a valve plate superimposed upon said cover and connected to said receptacle for sliding movement to positions partially or wholly bridging said cover openings.

References Cited in the file of this patent

UNITED STATES PATENTS

| | | |
|---|---|---|
| 1,188,067 | Greer | June 20, 1916 |
| 1,221,838 | Crist | Apr. 10, 1917 |
| 1,524,140 | Klingstine | Jan. 27, 1925 |